United States Patent [19]

Tajiri

[11] Patent Number: 5,581,277

[45] Date of Patent: Dec. 3, 1996

[54] ANTI-CARPAL TUNNEL DEVICE (ACTD) FOR COMPUTER OPERATORS

[76] Inventor: Akira Tajiri, 19371 E. Parlier Ave., Reedley, Calif. 93654

[21] Appl. No.: 398,861

[22] Filed: Mar. 6, 1995

[51] Int. Cl.⁶ .................................................. G09G 5/08
[52] U.S. Cl. ...................... 345/163; 248/118.1; D14/114
[58] Field of Search .................................... 345/156, 157, 345/160, 163–165; 341/20, 21; 248/118, 118.1, 118.3, 918, 919; 400/715; D14/114; 361/380, 381; 200/5 R

[56] References Cited

U.S. PATENT DOCUMENTS

| | | | |
|---|---|---|---|
| 3,835,464 | 9/1974 | Rider | 345/164 |
| 4,650,934 | 3/1987 | Burke | 200/5 R |
| 4,862,165 | 8/1989 | Gart | 341/20 |
| 4,913,573 | 4/1990 | Retter | 400/489 |
| 4,973,176 | 11/1990 | Dietrich | 345/168 |
| 5,157,381 | 10/1992 | Cheng | 248/118.1 |
| 5,165,630 | 11/1992 | Connor | 248/118.1 |
| 5,203,845 | 4/1993 | Moore | 200/333 |
| 5,244,296 | 9/1993 | Jensen | D14/114 |
| 5,245,146 | 9/1993 | Florence | D14/114 |
| 5,260,696 | 11/1993 | Maynard, Jr | 345/163 |
| 5,287,090 | 2/1994 | Grant | 345/163 |
| 5,340,067 | 8/1994 | Martin et al. | 248/918 |
| 5,388,032 | 2/1995 | Gill et al. | 361/681 |
| 5,404,591 | 4/1995 | Brinnand et al. | 2/20 |
| 5,414,445 | 5/1995 | Kaneko et al. | 345/163 |

*Primary Examiner*—Richard Hjerpe
*Assistant Examiner*—Amare Mengistu
*Attorney, Agent, or Firm*—Poms, Smith Lande & Rose

[57] ABSTRACT

A computer mouse assembly for preventing Carpal Tunnel Syndrome includes a computer mouse and a palm support having a curved upper surface. The palm surface has a substantially flat lower surface that is adjustably mounted on the upper surface of the computer mouse. The palm support serves to prevent the user's wrist from significantly bending, thereby preventing Carpal Tunnel Syndrome despite extended use of the computer mouse. A first piece of hook or loop type material is attached to the computer mouse. A second piece of hook or loop type material is attached to the lower surface of the palm support. The palm support is mounted on the upper surface of the computer mouse by interconnecting the first piece of hook or loop type material to the second piece of hook or loop type material. The palm support may be moved to various positions on the surface of the computer mouse in order to adapt to the differing hand sizes of a variety of different users. The palm support may be attached to the computer mouse in other ways, such as by adhesive or snaps, or may be integrally molded with the mouse housing.

11 Claims, 3 Drawing Sheets

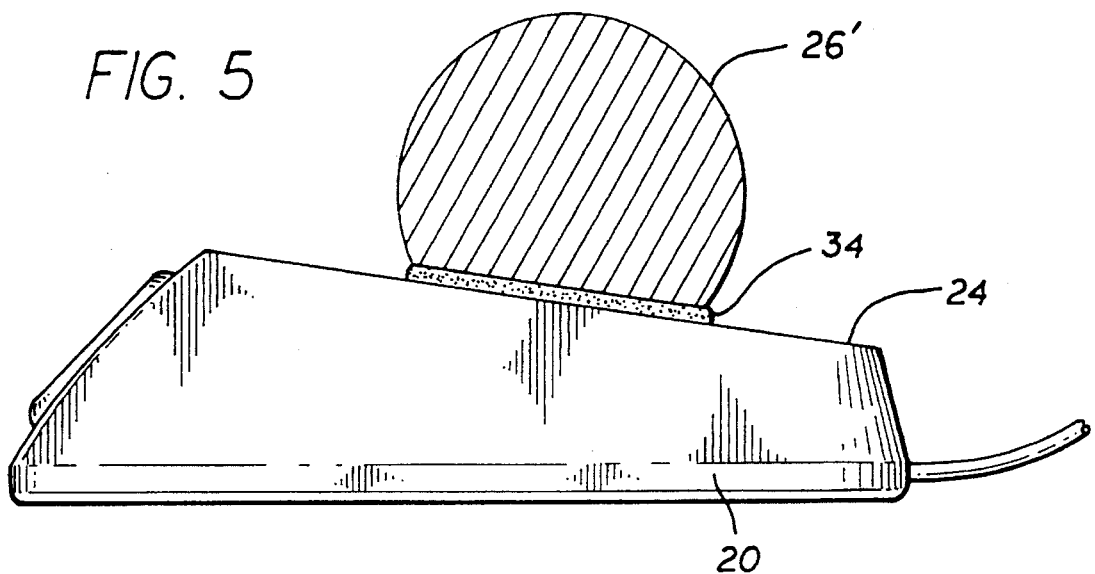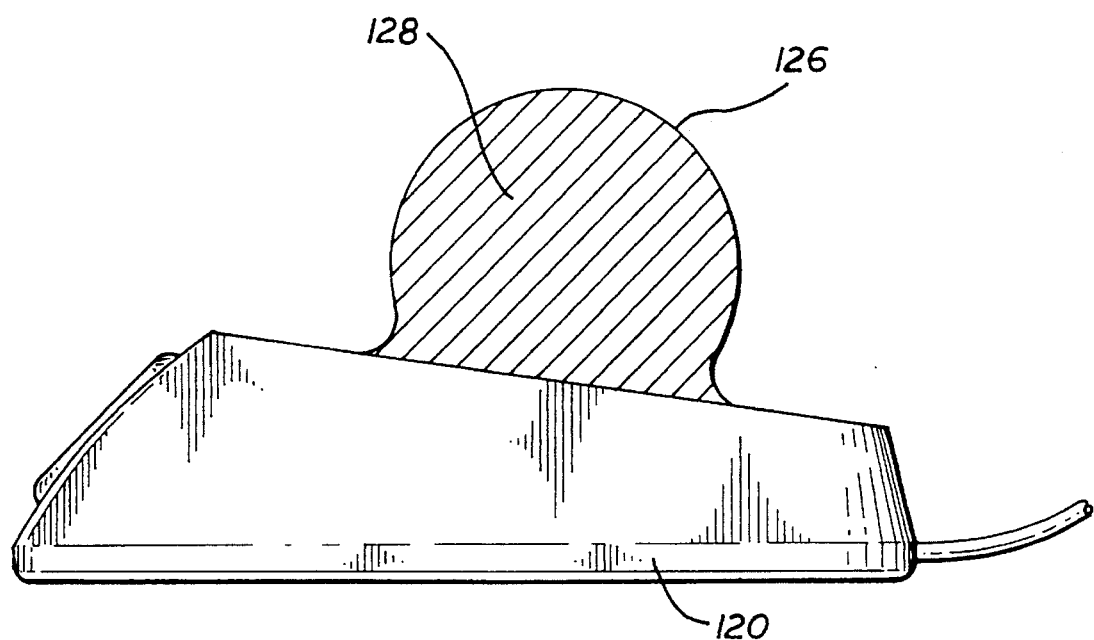

ANTI-CARPAL TUNNEL DEVICE (ACTD) FOR COMPUTER OPERATORS

BACKGROUND OF THE INVENTION

1. Field of the Invention

This invention relates generally to a computer mouse that protects the user from developing Carpal Tunnel Syndrome or from aggravating an existing such condition and, more specifically, to a computer mouse having a curved member on its upper surface that can be repositioned to adapt to different shapes and sizes of hands.

2. Prior Art

According to the third edition of the American Medical Association Family Medical Guide, nerves run through confined spaces at certain points in the body where they can become severely pinched if surrounding tissues become swollen. A major nerve particularly subject to this kind of damage is one that carries signals between the brain and hand. As it travels through the wrist, this nerve passes through a tunnel formed by the wrist bones (known as the carpals) and a tough membrane on the underside of the wrist that binds the bones together. The tunnel is rigid, so that if tissues within it swell for some reason, they press on and pinch the nerve. This leads to a condition called Carpal Tunnel Syndrome. *American Medical Association Family Medical Guide,* 3rd Edition (Random House 1994), page 300.

The symptoms of Carpal Tunnel Syndrome are a tingling, intermittent numbness of part of the hand often accompanied by pains that shoot up the forearm from the wrist. If severe, permanent numbness and limited movement of the thumb and possibly the fingers can result. Common treatments for this unfortunate condition include wearing a splint about the wrist, cortisone injections and even operations to open and enlarge the tunnel.

People who do extensive work on computer keyboards and computer mouses are among those who are most at risk of developing Carpal Tunnel Syndrome. This is because strenuous or repeated use of the wrist, and particularly repeated actions that include bending of the wrist, cause Carpal Tunnel Syndrome. The typical computer keyboard and computer mouse require the operator to significantly bend his or her wrist, and repeated use of the keyboard or mouse over an extended period of time can cause Carpal Tunnel Syndrome.

Several attempts have been made to design a computer mouse to reduce hand and wrist muscle fatigue. However, these designs generally do little to prevent bending of the wrist, cannot be adjusted to meet the needs of a particular user and would be expensive to acquire. U.S. Pat. No. 4,862,165 to Gart discloses an ergonomically-shaped hand controller that is molded to have various curves on the surface for supporting the hand during use. However, the device is not directed to preventing the wrist from bending during use. Also, the locations and sizes of the curves cannot be adjusted to fit a particular shape or size of hand. Consequently, the premolded curves of Gart may not properly support the hand of a given user. Furthermore, a user that already owns a computer mouse would need to specially purchase the Gart mouse in order to take advantage of the Gart invention. Consequently, a mouse of this type is not likely to meet the needs of many users, and would also be expensive for most users to acquire.

U.S. Pat. No. 4,913,573 to Retter discloses a unique computer keyboard having a raised central portion designed to ergonomically support and steady the hand of the operator. While the Retter patent does not disclose a computer mouse per se, even if a mouse were to be constructed having the raised central curve of Retter, the position of the curve could not be adjusted to adapt to the shape and size of various users' hands. Additionally, as with the Gart device, a user would need to replace their existing mouse with a new mouse.

U.S. Pat. No. 5,157,381 to Cheng discloses a computer mouse having a curved upper surface to support the base of the fingers and the palm of the hand. As with the Gart and Retter devices, the Cheng upper surface does not adapt to differently shaped hands, and a user would need to replace his or her existing mouse with a Cheng mouse. The mouse also does not prevent the repeated bending of the wrist that can cause Carpal Tunnel Syndrome.

Accordingly, there is a long felt need for a system that a user may purchase and install on his or her existing computer mouse to prevent bending of the wrist and to better support the hand during use of the mouse. Additionally, there is a need to provide existing computer mice with a curved upper surface that can be adjusted to adapt to the differing shapes and sizes of different users' hands.

SUMMARY OF THE INVENTION

Broadly considered, a computer mouse assembly in accordance with the present invention includes a computer mouse with a palm support mounted on the upper surface of the mouse. The palm support has a curved upper surface and may be repositioned on the surface of the mouse to adjust to the shape and size of the user's hand. The palm support serves to prevent the user's wrist from bending as compared to a conventional computer mouse, thereby preventing muscle fatigue and reducing the likelihood of contracting Carpal Tunnel Syndrome.

The present invention is helpful in overcoming the shortcomings of the prior art in a number of ways. First, the assembly may be adapted for use by a variety of different users. That is, a single computer mouse assembly according to the present invention may be adapted to meet the needs of a wide variety of users. Secondly, by fully or partially preventing the user's wrist from bending, strain on the wrist is significantly reduced in comparison to existing computer mice. Additionally, certain embodiments of the invention include a conventional computer mouse that has been inexpensively converted into a mouse that prevents the onset or aggravation of Carpal Tunnel Syndrome.

Various embodiments of the present invention may include features that overcome shortcomings of the prior art in other ways. In one preferred embodiment of the computer mouse assembly, the palm support has a lower surface with a piece of hook or loop material, also known as VELCRO, attached thereto or integral therewith. The upper surface of the computer mouse may include a mating piece of hook or loop type material for interconnecting with the hook or loop material on the palm support. If "loop" material is attached to the upper surface of the computer mouse, "hook" type material will be attached to the palm support, and vice-versa. This arrangement has the significant advantage of allowing a user to adapt the computer mouse that he or she already owns to include the palm support of the present invention. Additionally, the user may adjust the position of the palm support on the upper surface of the computer mouse to adjust to the size and shape of a particular user's hand.

Considering various other features that may be included in embodiments of the present invention, the hook or loop material on the upper surface of the computer mouse may be a strip that extends most or all of the length of the computer mouse. The user can then adjust the position of the palm support forward and backward along the strip of hook or loop material until the palm support is properly located in order to support the user's palm and to prevent significant bending of the wrist. Alternatively, rather than using a hook and loop type material arrangement, the palm support may have a pressure-sensitive adhesive coating on the lower surface thereof for removably mounting the palm support on the upper surface of the mouse. In yet another embodiment, the palm support may be permanently glued into place on the surface of the mouse.

The palm support may be made of various different materials and have various different shapes. The palm support may have a styrofoam member that is at least partially spherical. The styrofoam member may optionally be covered with a nylon, LYCRA or other type of covering for added comfort. Alternatively, the palm support could be molded plastic or another light-weight material. In one embodiment of the assembly, the palm support would have a dimension in one direction of at least one inch, and may also have a height of at least ¾ inch to substantially reduce the bending of the user's wrist.

Other objects, features, and advantages of the invention will become apparent from a consideration of the following detailed description and the accompanying drawings.

BRIEF DESCRIPTION OF THE DRAWINGS

FIG. 5 is a side view of a first alternative embodiment of the present invention with a sectional view of the palm support, which attaches to the upper surface of the mouse with a layer of pressure sensitive adhesive; and FIG. 6 is a side view of a second alternative embodiment, with a sectional view of a palm support that is integrally molded with the mouse housing.

DETAILED DESCRIPTION OF THE PREFERRED EMBODIMENTS

Figure 1:
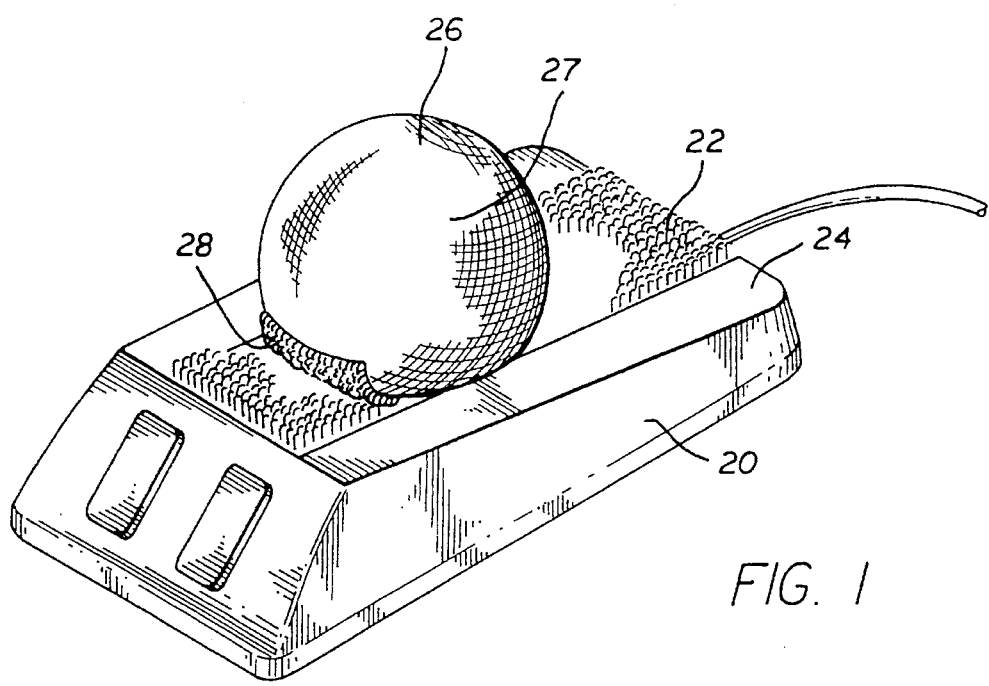
FIG. 1 is a perspective view of one embodiment of a computer mouse assembly according to the present invention.
Figure 2:
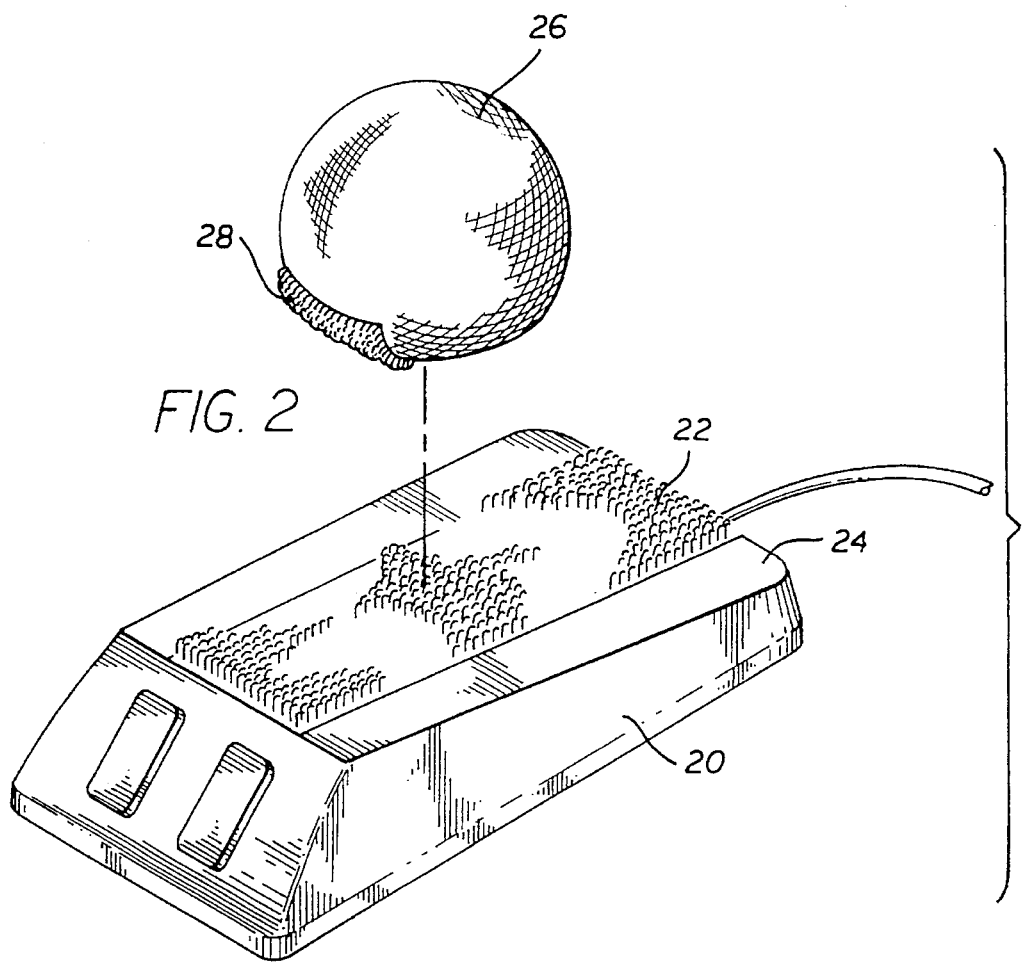
FIG. 2 is a partial exploded view of the assembly of FIG. 1 showing a computer mouse having a strip of hook or loop type material mounted on the upper surface thereof and a palm support having a mating strip of hook or loop type material mounted on the bottom surface thereof.

Referring now to FIGS. 1 and 2, an exemplary computer mouse 20 may be one of a variety of different computer mice, such as those sold by Microsoft and other companies. A strip of hook material 22 has been adhered to the upper surface 24 of computer mouse 20. Hook material 22 removably mates with a mating piece of loop material, with the hook and loop material together being known by the commercial name VELCRO.

A palm support 26 having a piece of loop type material 28 attached to the bottom thereto is shown engaged with strip of hook material 22. As shown in FIG. 2, palm support 26 may be disengaged from loop material 22. The palm support 26 remains in place during use, but the user may reposition it as desired for purposes of comfort. Each user's hand has a unique shape and size. Consequently, each user will want to custom-position palm support 26 to fit his or her hand and to minimize the bending of the wrist. The palm support 26 may be covered with a soft or resilient material 27 such as nylon or LYCRA or other soft material in order to protect the hand from chaffing and/or to cushion the hand.

With regard to size, palm support 26 will typically have a diameter of at least 1 inch and a height of at least ¾ inch. The palm support is typically partially spherical with a substantially flat bottom. The palm support of the present preferred embodiment corresponds to the upper ⅔ of a styrofoam sphere having a diameter of approximately 2 inches. However, the palm support of the present invention may alternatively be a full sphere, have an egg shape or have a variety of other shapes that are adapted to support the palm of the hand and to prevent bending of the wrist.

Figure 3:
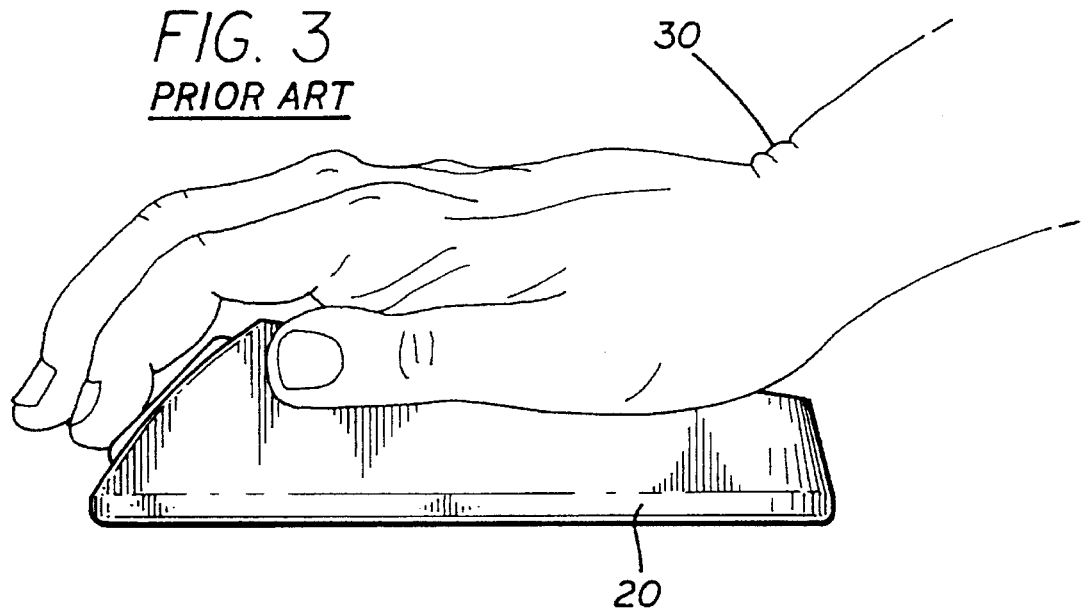
FIG. 3 shows the position of the user's hand and bent wrist on a conventional computer mouse.

FIG. 3 shows the position of the user's hand and wrist on a conventional computer mouse having a flat upper surface. The user must significantly and repeatedly bend the wrist to use the mouse. With other mouse designs not illustrated here, the user's wrist extends beyond the end of the mouse, with the wrist resting on the surface of the table or desk supporting the mouse. The user's wrist is significantly bent during use, the palm of the hand is not supported and, after extended use, the muscles of the hand and wrist become tired and fatigued. Over time, the tissue in the carpal tunnel may begin to swell and the user may develop Carpal Tunnel Syndrome, which makes further use of the mouse and/or keyboard painful or even impossible. Reference numeral 30 is a wrist that is significantly bent during normal use of the mouse.

Figure 4:
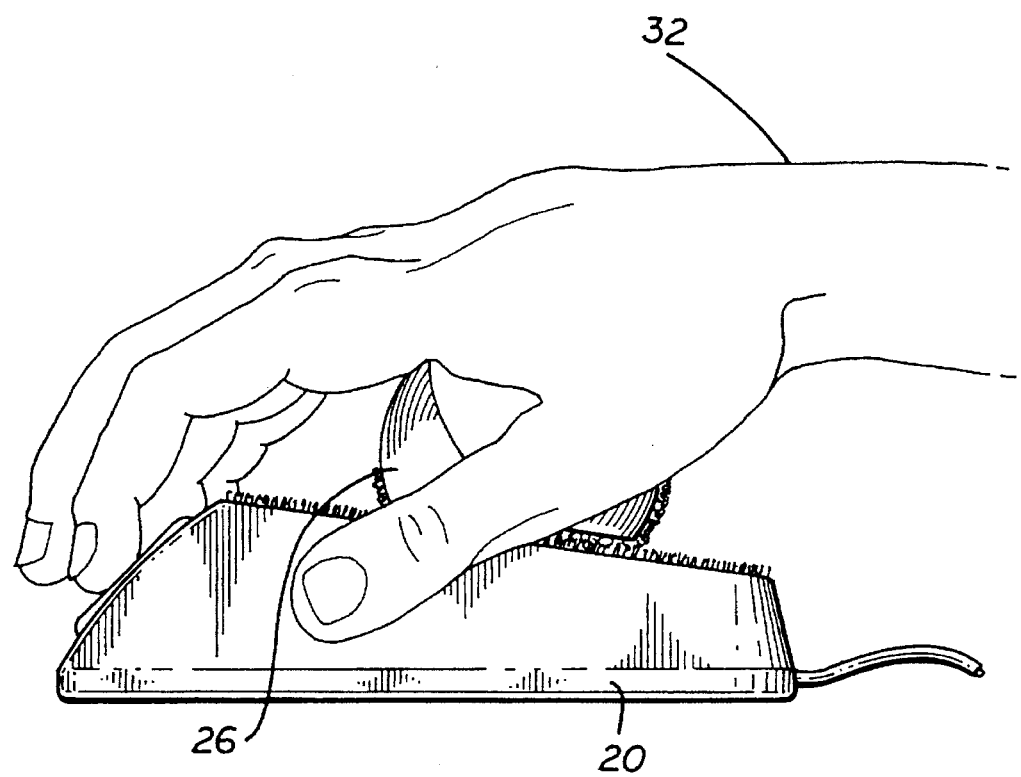
FIG. 4 shows a user's hand resting upon the palm support of the present invention, with the user's wrist relatively flat as compared to the wrist of FIG. 3.

On the other hand, when the user rests his or her palm on the palm support 26 as shown in FIG. 4, the user's palm is supported in such a manner that the user's wrist does not bend to any significant extent for purposes of developing Carpal Tunnel Syndrome. Furthermore, the support of the palm support prevents muscle fatigue in the hand and wrist, thereby enabling the user to use the mouse over an extended period of time. Reference numeral 32 indicates a wrist that is not significantly bent during normal use of the mouse. It may be noted that the present invention also prevents an existing Carpal Tunnel Syndrome condition from getting worse by keeping the wrist relatively straight.

Turning now to a first alternative embodiment of the present invention, FIG. 5 illustrates a palm support 26' mounted onto upper surface 24 of computer mouse 20 with a layer 34 of pressure sensitive adhesive. The pressure sensitive adhesive layer 34 holds palm support 26' in position during use of the mouse. However, the user may dismount palm support 26 from the mouse by applying an appropriate amount of peel force. The user may then reposition palm support 26' to another location on upper surface 24 of computer mouse 20. As another alternative, layer 34 of adhesive may be a glue to permanently bond palm support 26' to a particular location on upper surface 24. Such a glue should be a strong epoxy or other long lasting glue.

Turning now to a second alternative embodiment of the present invention, FIG. 6 illustrates a computer mouse 120 having a palm support 126 integrally molded into the housing of the mouse. The palm support 126 is shown in cross-section, while the remainder of mouse 120 is viewed from one side. Palm support 126 preferably has a molded plastic exterior with a lightweight core 128 of styrofoam, balsa wood, or other lightweight fill material. However, core

128 may be solid molded plastic, although the computer mouse might then become undesirably heavy. Core 128 may also be hollow.

Palm supports 26' and 126 may be covered with a nylon or LYCRA covering material to cushion the user's hand and/or provide protection against chafing of the hand during extended use of the mouse. Additionally, palm supports 26, 26', and 126 may be made of neoprene or foam rubber for a full cushioning effect. Palm support 126 would then not be integrally molded with mouse 120 but would instead be attached by some other means, such as screws, tacks, or glue.

In conclusion, it is to be understood that the foregoing detailed description and the accompanying drawings relate to preferred embodiments of the invention. Various changes and modifications may be made without departing from the spirit and scope of the invention. Thus, by way of example and not of limitation, the palm support 26 may be attached to the upper surface 24 of computer mouse 20 by a pressure sensitive adhesive rather than by VELCRO. The palm support 26 is typically made of styrofoam, but may also be made of molded plastic, light weight wood, foam rubber or a variety of other materials. The material should be lightweight, however, so that the user may easily maneuver the computer mouse. Generally speaking, the palm support should weigh 25% or less of the weight of the mouse, and preferably 15% or less, although the maximum allowable palm support weight will vary among different mice.

The VELCRO strip 22 may be attached to the upper surface of the computer mouse 20 by a strong adhesive or glue. The VELCRO strip 22 may have an adhesive backing and may be covered with a release strip (not shown), so that when the user purchases the VELCRO strip 22, she or he may simply remove the release strip and apply the VELCRO strip directly onto the upper surface of the mouse 20. Similarly, VELCRO pad 28 may be attached to palm support 26 by a variety of different ways, including adhesives. It is presently preferred to use 3-inch self-sticking strips of hook and loop material for strips 22 and 28, such as those sold under the name "Self-Sticking Hook-and-Loop Fasteners" sold by Radio Shack stores under the ARCHER trade name, Catalog No. 64-2345. An alternative to hook-and-loop fastening systems is the "Superlock Fasteners" product sold by Radio Shack under the ARCHER trade name, Catalog No. 64-2363, which is provided in three-inch strips backed by a pressure-sensitive adhesive. Other products may be used., so long as the palm support is held in place on the upper surface of the mouse during use and the palm support may be repositioned to adapt to the size and shapes of the user's hand.

The present invention includes various other embodiments. For instance, palm support 26 may be attached to mouse 20 in a variety of different ways. One such way is to have a threaded bolt or screw extend downwardly from the bottom of palm support 26. Mouse 20 would then be provided with a series of spaced bolt apertures for receiving the bolt extending downwardly from palm support 26. The palm support 26 could then be screwed into any of the bolt apertures provided on the mouse to position palm support 26 as the user desires. Instead of a bolt, palm support 26 could simply include a downwardly-extending post, and computer mouse 20 could include various apertures to receive the post. The user would then insert the post in a selected aperture in order to position palm support 26 properly for the user's hand. Similarly, palm support 26 can be provided with a snap that snaps into snap receptacles that are either integral with the upper surface of computer mouse 20 or else are provided on a pad that is itself attached to computer mouse 20. Various other mounting arrangements may be employed, and mechanisms may be used in which the palm support is permanently attached to the mouse but in which the position and/or support angle of the support may be adjusted.

It should be noted that although exemplary dimensions have been given for palm support 26, a wide variety of shapes and sizes of palm supports may be used. For example, someone with a very large hand may wish to have a palm support 26 that has a diameter of greater than 2 inches. Larger or smaller dimensions than those given may also be used. A user may even wish to have a variety of different diameter palm supports 26 to provide more or less support at a given time, or to allow a variety of users to utilize the same system, with each user having their own palm support to use adapted to their own hand.

Accordingly, the present invention is not limited to the specific embodiment shown in the drawings and described in the detailed description.

What is claimed is:

1. A computer mouse assembly for reducing hand and wrist fatigue and for preventing Carpal Tunnel Syndrome comprising:

a computer mouse having a substantially integral upper surface and a length; and a substantially spherical palm support having a rounded upper surface, said palm support being detachably and adjustably mounted on a piece of hook and loop material on said upper surface of said computer mouse;

wherein a user may detach said palm support from said mouse and may then reposition and reattach said palm support forwardly or backwardly along at least a portion of the length of said mouse, and wherein the palm support serves to prevent the wrist from significantly bending when the palm of the hand rests upon the palm support, even when the user is moving the mouse, and wherein a user may quickly and inexpensively convert an ordinary computer mouse to a mouse having enhanced support for the palm that prevents bending of the wrist, by mounting said piece of hook and loop material onto said upper surface of said computer mouse for use in conjunction with said palm support.

2. A computer mouse assembly as defined in claim 1, wherein said palm support has a lower surface, said lower surface having a pressure-sensitive adhesive coating for mounting said palm support to said upper surface of said mouse.

3. A computer mouse assembly as defined in claim 1, wherein said palm support has a lower surface with a first piece of hook or loop type material and said upper surface of said computer mouse includes a second piece of hook or loop type material for interconnecting with said first piece of hook or loop material to mount said palm support on said upper surface of said computer mouse.

4. A computer mouse assembly as defined in claim 3, wherein said second piece of hook or loop material is a strip of material extending most of the length of said upper surface of said computer mouse.

5. A computer mouse assembly as defined in claim 1, wherein said substantially spherical palm support has a generally flat bottom portion for mounting the palm support on the upper surface of the mouse.

6. A computer mouse assembly as defined in claim 1, wherein said palm support is covered with a substantially non-abrasive covering.

7. A computer mouse assembly as defined in claim 1, wherein said palm support is at least predominantly styrofoam.

8. A computer mouse assembly as defined in claim 1, wherein said palm support has a diameter of at least one inch.

9. A computer mouse assembly as defined in claim 1, wherein said palm support is at least ¾ inch tall.

10. A computer mouse assembly for reducing hand and wrist fatigue comprising:

a computer mouse having an upper surface;

an inexpensive, lightweight palm support having a convex upper surface and a substantially flat lower surface, said palm support being adjustably mounted on top of said upper surface of said computer mouse, with the palm support serving to prevent a user's wrist from significantly bending when the user's palm rests on the palm support;

a palm support attachment system comprising a first piece of hook and loop-type material attached to said computer mouse and a second piece of hook and loop-type material attached to said lower surface of said palm support;

wherein said palm support is mounted on said upper surface of said computer mouse by interconnecting said first piece of hook and loop-type material to said second piece of hook and loop-type material, wherein the palm support may be moved to different positions on top of said computer mouse and then reattached to said first piece of hook and loop-type material so as to be adaptable to the differing hand sizes and configurations of a variety of users, and wherein said palm support attachment system permits a user to quickly and inexpensively convert a variety of different brands and configurations of computer mice to include enhanced palm support and to prevent the wrist from bending, thereby reducing the liklihood that the user will develop carpal tunnel syndrome.

11. A method for easily and inexpensively configuring any of a wide variety of standard computer mice with an assembly for reducing hand and wrist fatigue, the method comprising the steps of:

providing a computer mouse having an upper surface, said computer mouse being any of a wide variety of standard, off-the shelf computer mice;

providing a styrofoam palm support having a convex upper surface and a substantially flat lower surface, said styrofoam palm support comprising the major portion of a sphere and having a height of at least one inch;

providing a palm support attachment system comprising a strip of hook and loop-type material and a piece of hook and loop-type material;

attaching said strip of hook and loop-type material to said computer mouse, such that said strip extends along at least the major portion of the length of the mouse;

attaching said piece of hook and loop-type material to said lower surface of said palm support;

mounting said palm support onto said upper surface of said computer mouse by interconnecting said strip of hook and loop-type material attached to the upper surface of said computer mouse to said piece of hook and loop-type material attached to said palm support;

adjusting the position of the palm support on said upper surface of said computer mouse, by pulling on said palm support to unattach it from said strip of hook and loop material, moving said palm support along the length of said palm support to a new position, and reattaching said palm support at the new position;

wherein the position of the palm support is adaptable to the differing hand sizes and configurations of a variety of users, with the palm support serving to prevent a user's wrist from significantly bending when the user's palm rests on the palm support, and wherein said palm support attachment system permits a user to use said palm support with a variety of different brands and configurations of computer mice.

* * * * *